United States Patent [19]

Galasso

[11] Patent Number: 5,149,687
[45] Date of Patent: Sep. 22, 1992

[54] METHOD FOR MAKING ORIENTED BISMUTH AND THALLIUM SUPERCONDUCTORS COMPRISING COLD PRESSING AT 700 MPA

[75] Inventor: Francis S. Galasso, Manchester, Conn.

[73] Assignee: United Technologies Corporation, Hartford, Conn.

[21] Appl. No.: 678,507

[22] Filed: Apr. 1, 1991

[51] Int. Cl.$^5$ ............ C01B 13/14; C01F 11/02; C01G 3/02; B28B 1/00
[52] U.S. Cl. ............ 505/1; 505/725; 505/739; 505/782; 505/783
[58] Field of Search ........... 505/1, 739, 782, 783, 505/725; 264/239; 419/38, 39

[56] References Cited

U.S. PATENT DOCUMENTS

| | | | |
|---|---|---|---|
| 4,808,771 | 11/1989 | Cava et al. | 505/1 |
| 4,892,863 | 1/1990 | Agarwala | 505/1 |
| 4,939,308 | 7/1990 | Maxfield et al. | 505/1 |
| 4,971,946 | 11/1990 | Taylor | 505/1 |
| 4,973,575 | 11/1990 | Capone | 505/1 |
| 4,981,839 | 1/1991 | Kieser | 505/1 |
| 5,015,618 | 5/1991 | Levison | 505/1 |
| 5,017,548 | 5/1991 | Hirakawa | 505/1 |

FOREIGN PATENT DOCUMENTS

| | | | |
|---|---|---|---|
| 0212227 | 8/1989 | Japan | 505/782 |
| 0242419 | 9/1989 | Japan | 505/782 |
| 2252620 | 10/1990 | Japan | 505/1 |
| 0030265 | 2/1991 | Japan | 505/782 |

OTHER PUBLICATIONS

Hinks "Preparation of Bi-Sr-Ca-Cu-O Superconductor . . . " *Appl. Phys. Lett.* v. 53(5) Aug. 1, 1988, pp. 423-425.

Liang "Structural Characterization of TlCaBaCuO oxide . . . " *Appl. Phys. Lett.* vol. 53(15) Oct. 10, 1988, pp. 1434-1436.

Rong-ying "The Specific heat of the single-phase . . . " *Physica C* vol. 158 1989, pp. 255-257.

Chi "120k Superconducting transition in hot pressing . . . " *Solid State Comm.* vol. 68(3) Oct. 1988, pp. 309-311.

Cui "Properties of 107k Superconducting single phase in . . . " *Solid State Comm* vol. 70(3) 1989, pp. 287-289.

"Anisotropy in an Oriented $Ba_2YCu_3O_7$ Superconductor", by Lynds et al., J. Am. Ceram. Soc., 71 [3] C-130 to C-132 (1988).

"Studies on Anisotropic Upper Critical Fields of $HoBa_2U_3O_7$ and $ErBa_2Cu_3O_7$ Using Preferentially Oriented Pellets", by Takita et al.

*Primary Examiner*—Paul Lieberman
*Assistant Examiner*—John Boyd
*Attorney, Agent, or Firm*—George J. Romanik

[57] ABSTRACT

An oriented superconducting material may be made by cold pressing a nonoriented superconducting material selected from the group consisting of $Bi_1$, $Bi_2$, $Tl_1$, $Tl_2$, Pb substituted $Bi_1$, Pb substituted $Bi_2$, Pb substituted $Tl_1$, and Pb substituted $Tl_2$ superconductor materials at a pressure sufficient to form an oriented superconducting material.

4 Claims, 5 Drawing Sheets

METHOD FOR MAKING ORIENTED BISMUTH AND THALLIUM SUPERCONDUCTORS COMPRISING COLD PRESSING AT 700 MPA

DESCRIPTION

1. Technical Field

This invention relates to a method for making orientated bismuth and thallium superconductors.

2. Background Art

Since the discovery of high critical temperature ($T_c$) superconductors in the mid-1980s, tremendous efforts have been made to identify new high $T_c$ superconducting materials and new methods of making such materials. For the purposes of this application the term "high $T_c$ superconductors" refers to superconductors with a $T_c$ of greater than 77K, the boiling point of nitrogen. Among the known high $T_c$ superconductors are the so-called 1-2-3 materials, including $YBa_2Cu_3O_7$ and similar materials in which Sm, Eu, Gd, Dy, Ho, or Yb is substituted for Y, which have $T_c$s of about 90K; a Bi-Sr-Ca-Cu-O family of materials which have $T_c$s of about 90K to about 110K; and a similar Tl-Ba-Ca-Cu-O family of materials which have $T_c$s of about 107K to about 125K. The Bi-Sr-Ca-Cu-O superconducting materials have one of the following general formulae:

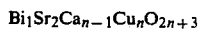

$$Bi_1Sr_2Ca_{n-1}Cu_nO_{2n+3}$$

or

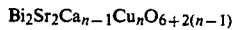

$$Bi_2Sr_2Ca_{n-1}Cu_nO_{6+2(n-1)}$$

where $1 \leq n \leq 3$. These materials will be referred to as $Bi_1$ and $Bi_2$ superconducting materials, respectively. Similarly, the Tl-Ba-Ca-Cu-O superconducting materials have one of the following general formulae:

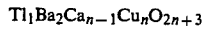

$$Tl_1Ba_2Ca_{n-1}Cu_nO_{2n+3}$$

or

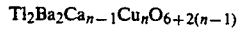

$$Tl_2Ba_2Ca_{n-1}Cu_nO_{6+2(n-1)}$$

where $1 \leq n \leq 3$. These materials will be referred to as $Tl_1$ and $Tl_2$ superconducting materials, respectively. In some cases, Pb may be substituted for some of the Bi or Tl in the $Bi_1$, $Bi_2$, $Tl_1$, and $Tl_2$ superconducting materials to stabilize higher temperature superconducting phases. For example, the compound $Bi_{1.8}Pb_{0.2}Sr_2Ca_2Cu_3O_x$ has a $T_c$ of about 110K. The materials in which Pb has been substituted for some of the Bi or Tl will be referred to as Pb substituted $Bi_1$, $Bi_2$, $Tl_1$, or $Tl_2$ superconducting materials.

All of the $Bi_1$, $Bi_2$, $Tl_1$, $Tl_2$, and analogous Pb substituted superconducting materials have layered two-dimensional crystalline structures in which the atoms are arranged in parallel Cu-O, Ca, Bi-O, Sr-O, Ba-O, and Tl-O planes. This two-dimensional arrangement can be seen in FIG. 1 which depicts the $Tl_2Ba_2CaCu_2O_8$ structure. By contrast, the 1-2-3 type superconductors, such as $YBa_2Cu_3O_{7-x}$ depicted in FIG. 2, have unit cells which more closely resemble a three-dimensional perovskite structure without the Bi-O and Tl-O layers which tend to make the bismuth and thallium superconductors more two-dimensional. Although 1-2-3 unit cells have parallel Cu-O planes, the Y and Ba atoms are located in the center of the subcells, giving the material its perovskite-like three-dimensional structure. For convenience, the crystalline structures of the superconducting materials may be described using standard terminology. The letters a, b, and c define the axes of a unit cell as shown FIGS. 1 and 2, while the symbol (hkl) denotes the Miller indices of a plane in the structure. The Miller indices of a plane (hkl) are defined as the reciprocals of the fractional intercepts the plane makes with the a, b, and c axes, respectively, multiplied by the smallest number that will express the reciprocals as integers. For example, (001) denotes the Miller indices of the ab plane, that is the planes perpendicular to the c-axis.

Many methods of making high $T_c$ superconductors have been developed, including dry powder methods and solution methods. In general, these methods involve mixing precursor materials, heating the precursor materials to produce a superconducting material, pressing the superconductor material to consolidate it into a desired shape, and firing the consolidated material to sinter it. Of particular interest, are methods of making oriented superconductors. Oriented superconductors have crystallites which are oriented relative to a particular crystallographic axis. Orientation may provide especially desirable properties. For example, if the Cu-O planes in the crystallites are oriented perpendicular to the c-axis, the material will have a higher critical current density through the ab planes than through other planes. As a result of this anisotropy, such oriented superconductor materials can carry higher current flows than nonoriented materials and are desirable for use in motors, generators, magnets, and other devices in which a high current flow is desirable.

Various methods for orienting superconductor crystallites are known. For example, films of superconductor precursors have been deposited onto directionally oriented substrates by sputtering, electrochemical methods, and other methods. The films assume the orientation of the substrate and remain directionally oriented after conversion into the superconductor form. Hot isostatic pressing or pressing between counterrotating rollers after electrodeposition onto a substrate are two other methods which have been used to orient superconductor crystallites.

In "Anisotropy in an Oriented $Ba_2YCu_3O_7$ Superconductor", J. Am. Ceram. Soc., 71 [3]C-130-C-132 (1988), Lynds et al. disclose that a 1-2-3 type superconductor may be oriented by cold pressing at about 700 MPa. Magnetization studies on the resulting material showed that critical current densities were greater in directions perpendicular to the pressing direction than in directions parallel to the pressing direction because the material was oriented. This effect is described in more detail in commonly-assigned, co-pending U.S. application Ser. No. 07/275,839.

Although various techniques of orienting particular high $T_c$ superconductors are known, the extreme unpredictability in the art of high $T_c$ superconductors makes it difficult to predict whether methods suitable for one particular superconductor material will work with another superconductor material. This is particularly true when dealing with materials having very different crystalline structures such as the 1-2-3 materials and the $Bi_1$, $Bi_2$, $Tl_1$, and $Tl_2$ materials. Despite these difficulties, it would be desirable to find a method which can be used to orient the $Bi_1$, $Bi_2$, $Tl_1$, and $Tl_2$ superconducting materials because their higher $T_c$s makes them potentially more useful in certain applications than the 1-2-3 materials.

Accordingly, there has been a continuous and ongoing effort to develop methods of producing oriented bismuth and thallium superconductors.

Disclosure of the Invention

The present invention is directed towards oriented bismuth and thallium superconductors and a method for making them.

One aspect of the invention includes a method for making an oriented superconducting material by cold pressing a nonoriented superconducting material selected from the group consisting of $Bi_1$, $Bi_2$, $Tl_1$, $Tl_2$, Pb substituted $Bi_1$, Pb substituted $Bi_2$, Pb substituted $Tl_1$, and Pb substituted $Tl_2$ superconductor materials at a pressure sufficient to form an oriented superconducting material.

Another aspect of the invention includes an oriented superconducting material made according to the above method.

The foregoing and other features and advantages of the present invention will become more apparent from the following description and accompanying drawings.

BEST MODE FOR CARRYING OUT THE INVENTION

Figure 1:
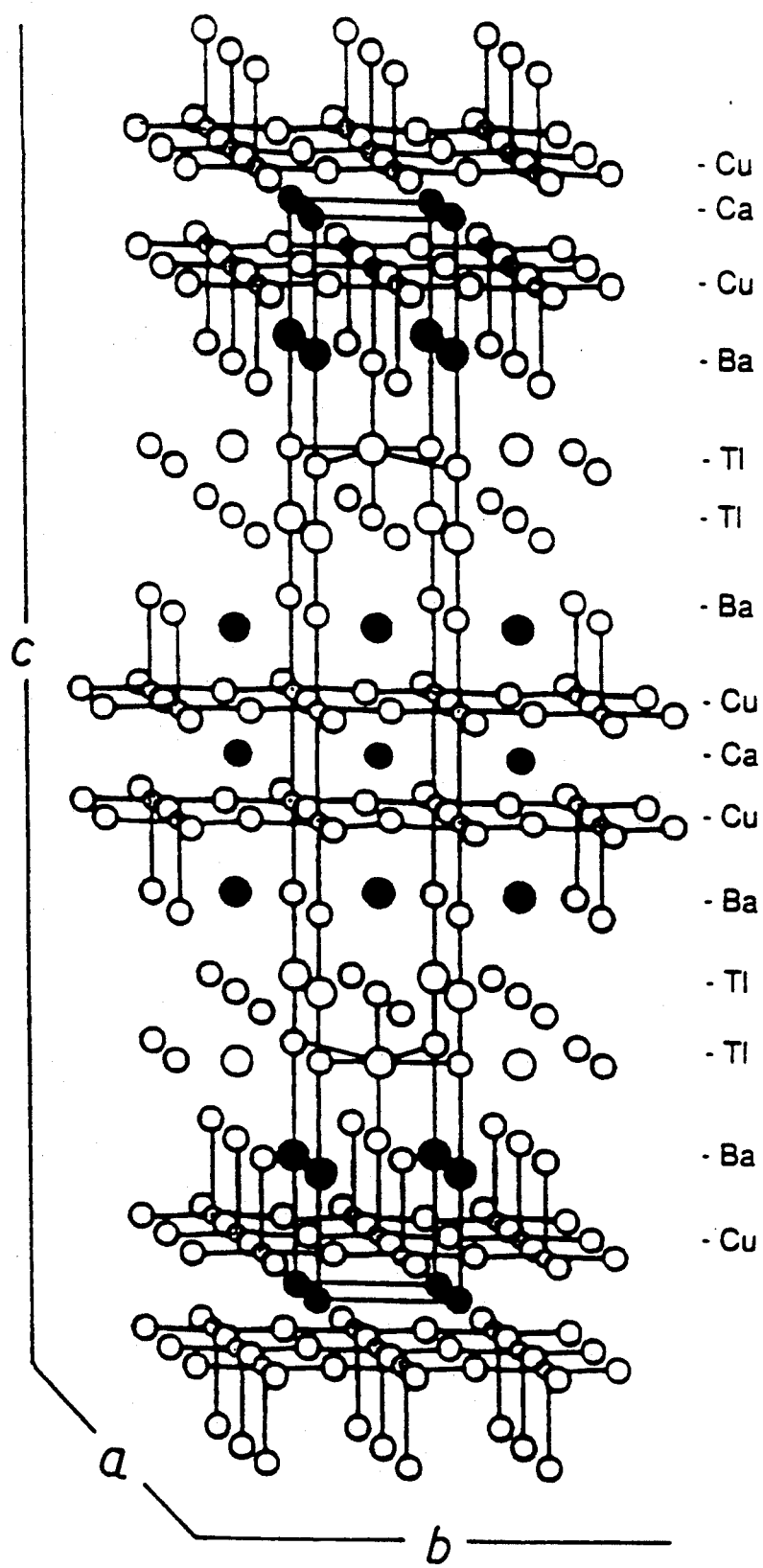
FIG. 1 depicts the $Tl_2Ba_2CaCu_2O_8$ structure.
Figure 2:
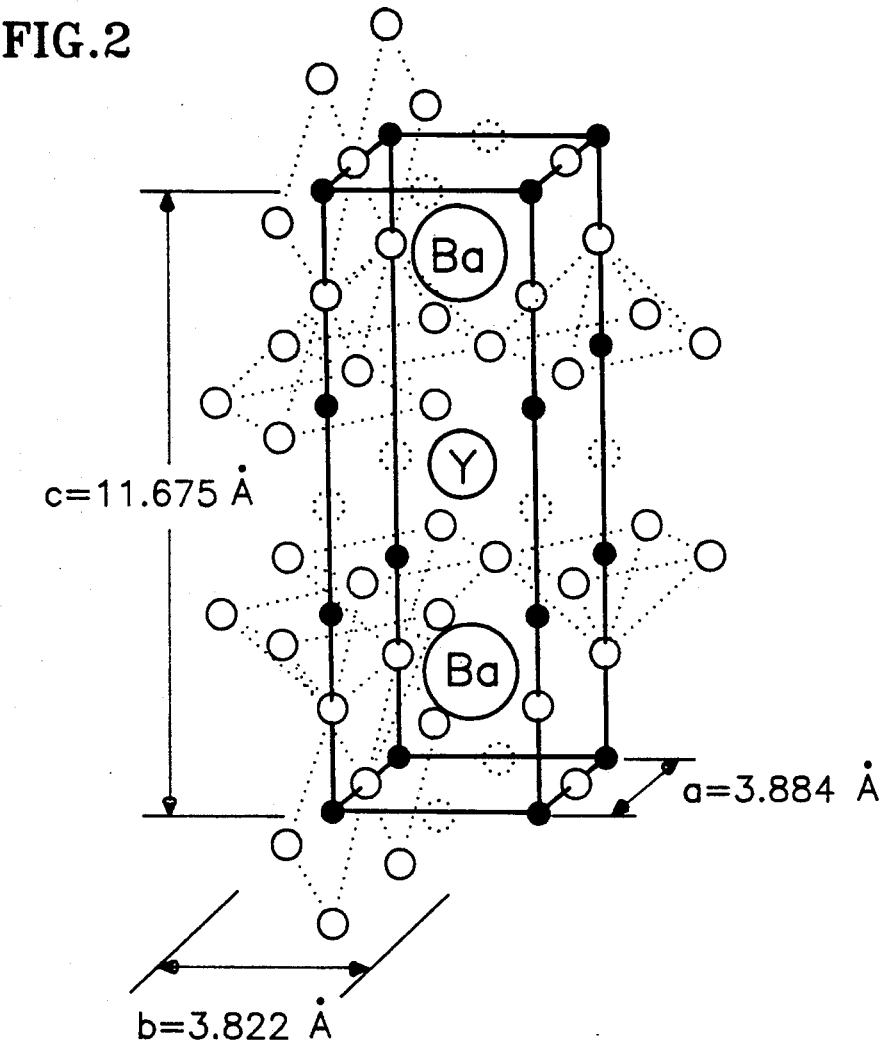
FIG. 2 depicts the $YBa_2Cu_3O_{7-x}$ structure.

The present invention is suitable for orienting all of the known $Bi_1$, $Bi_2$, $Tl_1$, $Tl_2$ and Pb substituted $Bi_1$, $Bi_2$, $Tl_1$, and $Tl_2$ superconductor materials. These superconductor materials may be prepared by the high temperature solid state reaction of a stoichiometric mixture of inorganic reactants such as oxides of Bi, Sr, Tl, Ba, Pb, Ca, and Cu. The reactants are typically generated in situ by decomposing precursor materials such as nitrates, citrates, carbonates, and other salts of Bi, Sr, Tl, Ba, Pb, Ca, and Cu which are capable of decomposing into the appropriate oxides. Precursor materials are often used when they can be obtained in higher purities than the oxides. When convenient, a mixture of salts and oxides may be used to form the desired superconductor material.

Several methods are available to generate a stoichiometric mixture of reactants from precursor materials. For example, powdered precursor materials may be mixed in a selected ratio and thermally decomposed to form a stoichiometric mixture of powdered reactants. In another method, the precursor materials may be dissolved in a hot, concentrated acid solution, such as $HNO_3$, to form an aqueous solution. Water may be evaporated from the solution to produce a dry residue and the dry residue may be heated to a temperature of about 200° C. to drive off volatiles. The devolatized residue may be ground to produce a fine powder of reactants. The acid method tends to produce a more uniform mixture of reactants, which in turn can produce a more uniform superconductor material.

After the stoichiometric mixture of reactants has been prepared, the mixture should be fired at an elevated temperature below the melting points of the reactants for about 10 hours to about 100 hours to convert the reactants into a superconducting material. Preferably, the Bi superconductors should be fired at about 700° C. to about 900° C., the Tl superconductors should be fired at about 800° C. to about 900° C., and the Pb substituted superconductors should be fired at about 800° C. to about 900° C. When firing the Tl superconductors, the reactants should be sealed in a container made from an inert material, such as a gold, to prevent the loss of Tl. Because the reactants typically may not be completely converted to the superconducting material in a single firing, repeated regrinding and reheating is often required.

After the superconducting material has been formed, it should be ground to form a powder which can be consolidated and crystallographically oriented by cold-pressing to form an oriented compact. Upon pressing, the crystallites in the superconductor compact assume a preferred orientation, with the c-axes of the crystallites aligned parallel to the pressing direction. Regardless of the method used to prepare the superconductor material, a pressure of at least about 500 MPa will orient the superconducting crystallites. Preferably, the pressure will be at least about 700 MPa. Higher pressures, for example a pressure of at least about 900 MPa, would be desirable. Experimentation has shown that the degree of crystallographic orientation increases with increasing consolidation pressure. The consolidation force may be applied statically or dynamically, Preferably, the consolidation force will be applied by static pressing, that is pressing in which the entire consolidation force is applied along a single axis, in order to achieve the maximum benefit of the consolidation force. This can be done by keeping the ceramic compact stationary while the consolidation force is applied along the c-axis. By contrast, dynamic pressing methods, such as rolling, apply some components of the consolidation force vector are applied in the a or b axes, rather than only in the c-axis.

After consolidation and orientation, the superconducting ceramic compact may be sintered to rigidize it and subsequently annealed to introduce $O_2$. The compact may be sintered by heating it in an oxygen-containing atmosphere, such as air or oxygen, to a temperature of about 800° C. to about 900° C. for about 40 hours to about 150 hours. Shorter sintering times, such as about 15 to 30 minutes, may be appropriate for Tl materials to prevent the loss of Tl. The compact may be annealed by slowly cooling it from the sintering temperature in an oxygen-containing atmosphere, preferably at a rate of less than about 100° C./hr. Once the compact has been cooled to about 700° C., its temperature may be maintained at about 700° C. for about 12 to about 24 hours prior to further cooling. Although the sintering and annealing steps might diminish the degree of crystallite orientation, no decrease in orientation has been observed after sintering and annealing.

Crystallographic orientation may be detected by X-ray diffraction analysis. Oriented samples exhibit increased intensity of reflections by the (001) planes, that is, ab planes perpendicular to the pressing direction, relative to the intensities of reflections from other planes. One way of determining orientation would be to compare the reflection intensities from the $(00\underline{10})$ and (105) planes. For example, a ratio of reflection intensity from the $(00\underline{10})$ plane to the reflection intensity of the (105) plane of greater than about 0.4 indicates that the material is oriented along the ab planes. Larger ratios represent greater degrees of orientation. For example, a ratio of 1 or greater would indicate that the material is much more oriented that a material with a lower ratio, while a ratio of 4 or greater would indicate an even higher degree of orientation.

EXAMPLE 1

Figure 3:
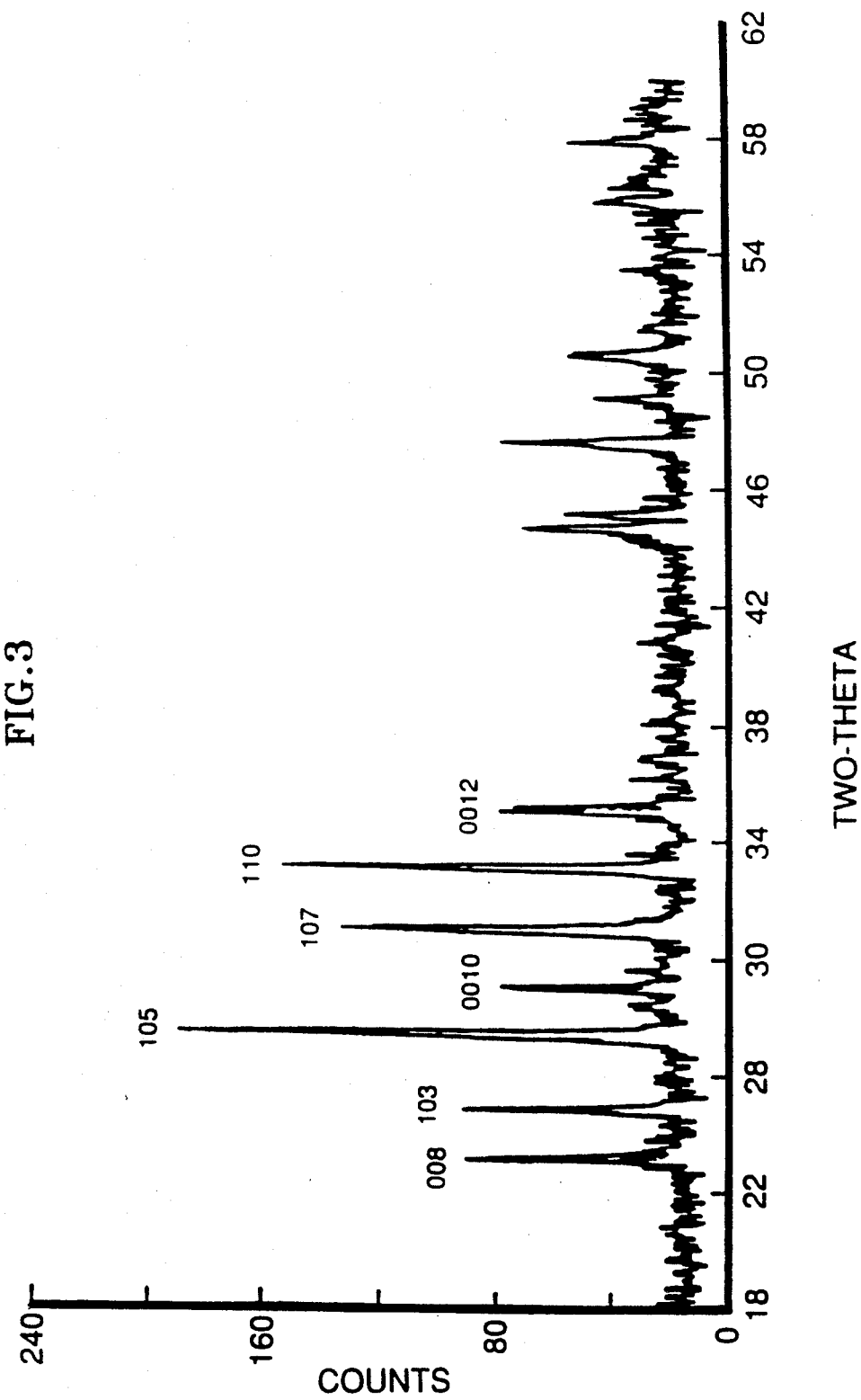
FIG. 3 depicts x-ray reflections from a $Bi_2Sr_2CaCu_2O_8$ superconductor powder prior to being oriented according to the present invention.
Figure 4:
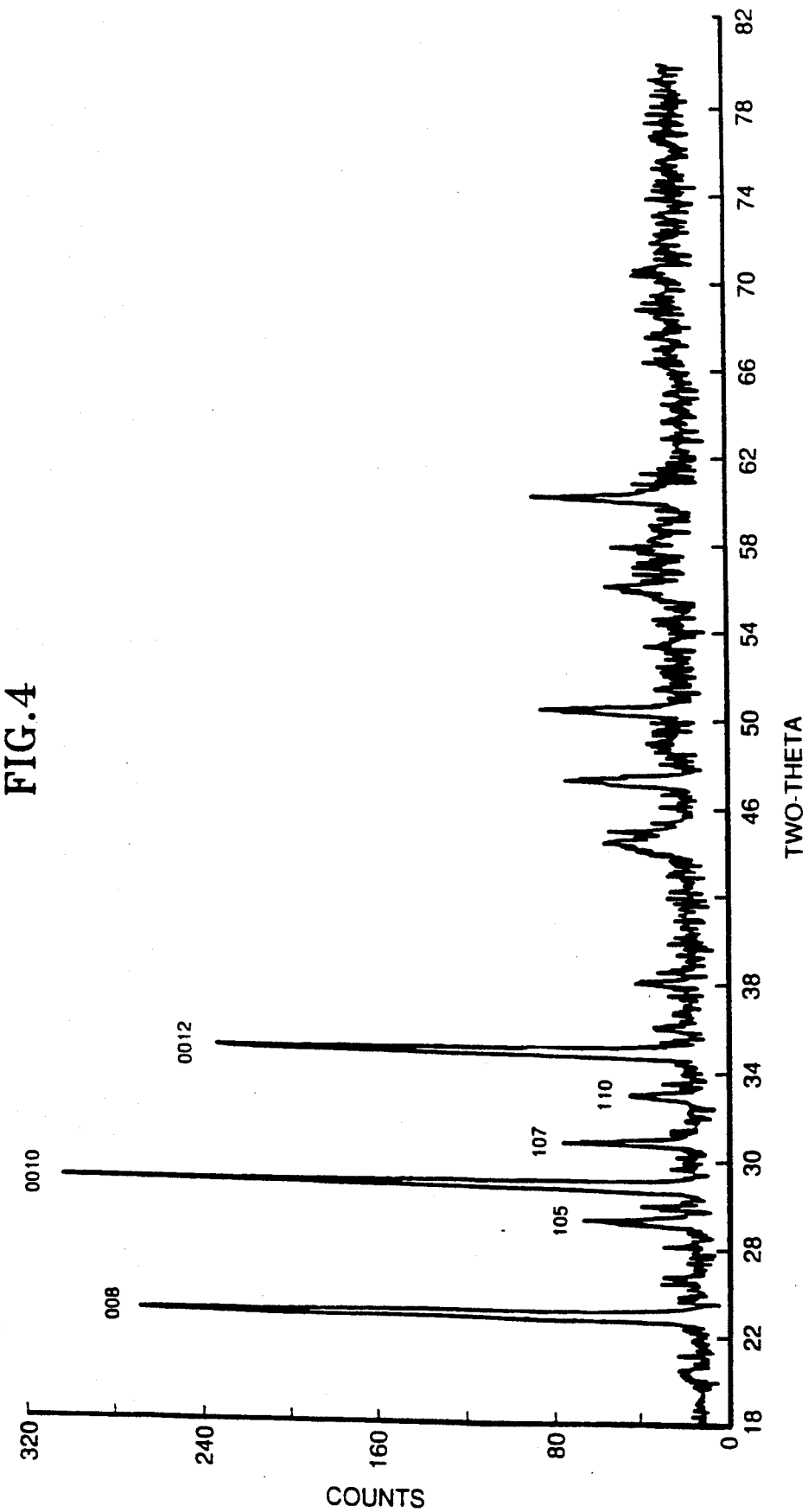
FIG. 4 depicts x-ray reflections from a $Bi_2Sr_2CaCu_2O_8$ superconductor compact after being oriented according to the present invention.

Suitable quantities of $Bi_2O_3$, $SrCo_3$, $CaCO_3$, and CuO were ground together and heated to 860° C. for 24 hours to form a homogeneous, stoichiometric mixture of inorganic reactants and slowly cooled to form a superconductor material with a composition of $Bi_2Sr_2CaCu_2O_8$. The resulting superconductor material was finely ground and cold-pressed under static conditions at 700 MPa to form a cylindrical disc with a diameter of 1.25 cm. The disc was sintered at 860° C. for 24 hours and slowly cooled over 16 hours. X-ray diffraction analysis was used to determine the degree of orientation achieved in the pressed disc as compared to the ground powder which had not yet been pressed. FIG. 3 depicts the x-ray reflections from the unpressed material, while FIG. 4 depicts the x-ray reflections from the pressed material. The unpressed sample had a ratio of reflection intensity from the $(00\underline{10})$ plane (about d=3.08) to the reflection intensity from the (105) plane (about d=3.25) of about 0.4, while the pressed sample had a ratio of about 4.7, indicating that the pressed sample was significantly oriented perpendicular to the c-axis, that is, along the ab planes. As determined by a rejection force on a magnet above the sample, the Meisner effect for the pressed sample was large in comparison to other samples which were cold pressed at lower pressures.

EXAMPLE 2

Figure 5:
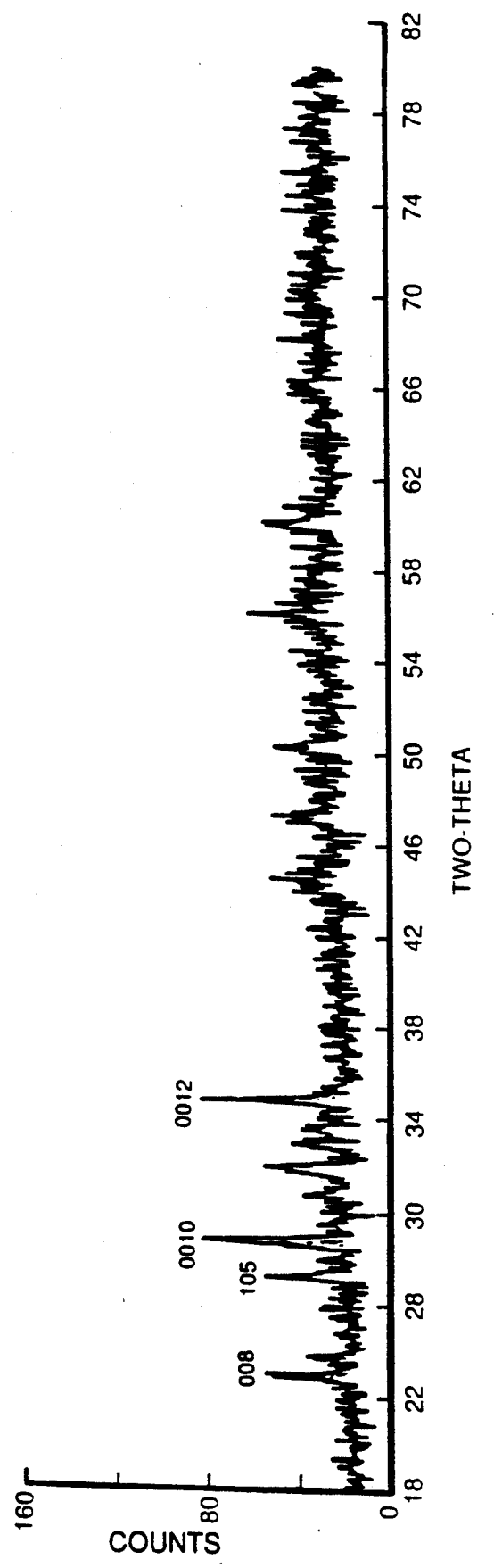
FIG. 5 depicts x-ray reflections from a $Bi_{1.8}Pb_{0.2}Sr CaCu_2O_x$ superconductor compact after being oriented according to the present invention.

Stoichiometric quantities of $Bi_2O_3$, PbO, $SrCO_3$, $CaCO_3$, and CuO were ground together and heated to 840° C. for 117 hours to form a superconductor material with a composition of $Bi_{1.8}Pb_{0.2}SrCaCu_2O_x$. The resulting superconductor material was finely ground and cold pressed under static conditions at 700 MPa to form a cylindrical disc with a diameter of 1.25 cm. The disc was sintered at 840° C. for 117 hours and slowly cooled over 16 hours. X-ray diffraction analysis, shown in FIG. 5, indicated that the coldpressed and sintered disc was oriented along the ab planes as shown by a ratio of the $(00\underline{10})$ reflection intensity to the (105) reflection intensity of about 1.6.

The oriented bismuth and thallium superconducting materials of the present invention are improvements over the prior art because they combine the benefits of orientation, including higher critical current densities, with higher $T_c$s. As a result, the oriented superconductors of the present invention are potentially more useful in certain applications than prior art oriented superconductors. The benefits of the present invention can be expected from the full range of $Bi_1$, $Bi_2$, $Tl_1$, $Tl_2$, and Pb substituted $Bi_1$, $Bi_2$, $Tl_1$, and $Tl_2$ high $T_c$ superconductor materials because of the similarities in their crystal structures.

It should be understood that the invention is not limited to the particular embodiment shown and described herein, but that various changes and modifications may be made without departing from the spirit or scope of the claimed invention.

I claim:

1. A method for making an oriented superconducting material, comprising:
    cold pressing a nonoriented superconducting material selected from the group consisting of $Bi_1$, $Bi_2$, $Tl_1$, $Tl_2$, Pb substituted $Bi_1$, Pb substituted $bi_2$, Pb substituted $Tl_1$, and Pb substituted $Tl_2$ superconductor materials at a pressure of at least about 700 MPa to form an oriented superconducting material that has a ratio of x-ray refection intensity from the $(00\underline{10})$ plane to the reflection intensity from the (105) plane of 1.6 or greater.

2. The method of claim 1 further comprising sintering and annealing said oriented superconducting material in an oxygen-containing atmosphere to form a superconducting article.

3. The method of claim 1 wherein said cold pressing is done under static conditions.

4. The method of claim 1 wherein said oriented superconducting material has a ratio of x-ray reflection intensity from the $(00\underline{10})$ plane to the reflection intensity from the (105) plane of greater than 4.

* * * * *